March 11, 1958     H. J. JEZEK     2,826,028
STALK PICK-UP ASSEMBLY FOR SHREDDING MACHINES Filed Sept. 9, 1955     2 Sheets-Sheet 1

INVENTOR.
HENRY J. JEZEK
BY
McMorrow, Berman + Davidson
ATTORNEYS

INVENTOR.
HENRY J. JEZEK
BY
McMorrow, Berman & Davidson
ATTORNEYS

United States Patent Office 2,826,028
Patented Mar. 11, 1958

2,826,028
STALK PICK-UP ASSEMBLY FOR SHREDDING MACHINES
Henry J. Jezek, Troy, Tex.
Application September 9, 1955, Serial No. 533,426
3 Claims. (Cl. 55—118)

This invention relates to machines for shredding stalks in the field, and more particularly has reference to an improved stalk pick-up means for a machine of this type.

One important object of the present invention is to provide a pick-up assembly for stalks, which will be particularly adapted to guide the material to be shredded into the path of rapidly rotating radial arms having shredding blades on the ends thereof, thus to insure that all of said material will be properly shredded during movement of the machine through a field.

Another object of importance is to so design the pick-up means as to cause the same to, after guiding the material to the radial arms, maintain the material in the path of the rapidly rotating shredding blades for a sufficient period of time to positively insure that the material will be fully shredded.

Yet another object is to so form the pick-up means as to cause the same to extend along the back of the frame, providing outlets between the closely spaced tines of the pick-up means through which the shredded material will be directed after the blades have acted thereupon.

Still another object of importance is to provide a stalk pick-up or tine assembly as stated which will be wholly separable from the remaining portion of the shredding machine structure, to facilitate cleaning, maintenance, and repair of the component parts both of the pick-up means and of the shredding machine proper.

Yet another object is to so form the tines of the pick-up means as to insure that they will properly lift the stalks to be shredded, even though said stalks may be lying substantially horizontally in close proximity to the ground surface, with the stalks being lifted initially at the time they move into the machine, and being subsequently lifted once again immediately prior to their being shifted into the paths of the rotary blades.

Other objects will appear from the following description, the claims appended thereto, and from the annexed drawing, in which like reference characters designate like parts throughout the several views, and wherein:

Figure 1:
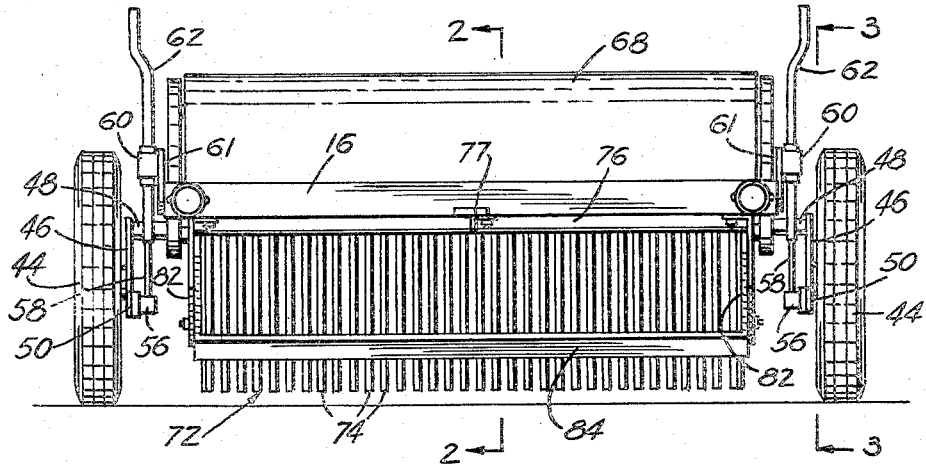
Figure 1 is a rear elevational view of a shredding machine equipped with a pick-up or tine assembly formed according to the present invention.

The reference numeral 10 has been applied to a shaft, extending substantially horizontally within a rectangular, horizontally disposed open frame having bearings 12 secured to the undersides of the frame side members 14, the ends of the shaft being journalled in said bearings. The frame includes additionally a transversely extending rear frame member 16 and a front frame member 18 parallel to the front member. A V-shaped draw bar 20 is secured to and extends forwardly from the front member 18 of the frame.

Figure 4:
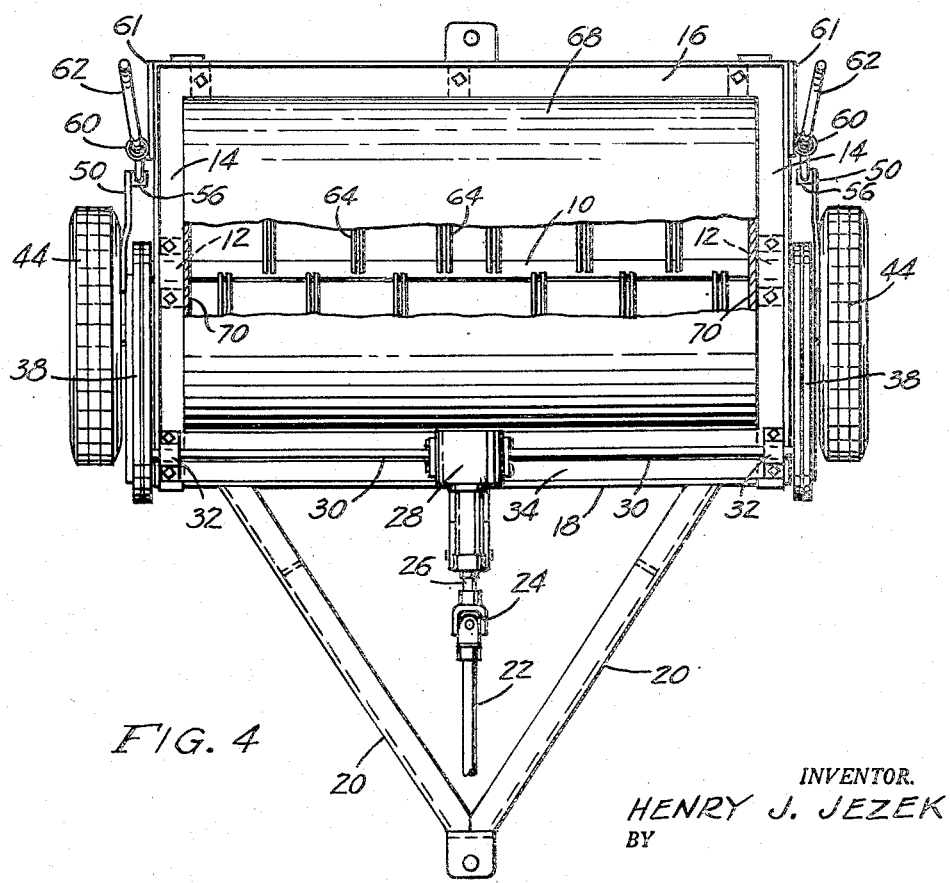
Figure 4 is a top plan view of the structure with a portion of the housing broken away.

To drive the shaft, there is provided a shaft 22 connectable to a power take-off, not shown, of a traction vehicle such as a tractor, and connected at its rear end to a universal joint 24 transmitting drive to a spline shaft 26 extending into a gear box 28. Projecting outwardly from the gear box in opposite directions as shown in Figure 4 are shafts 30, driven through the medium of suitable gearing provided in the gear box, and journalled at their outer ends in bearings 32 mounted upon the front ends of the sides of the frame. The gear box and the bearings 32 are mounted upon a horizontally, transversely extending support bar 34, that is fixedly secured to the frame in a position elevated above the main plane of the frame.

Secured to the outer ends of shafts 30 are pulleys 36 about which are trained belts 38, driving pulleys 40 secured to the ends of the shaft 10 for the purpose of rotating the shaft at a predetermined rate of speed.

Figure 3:
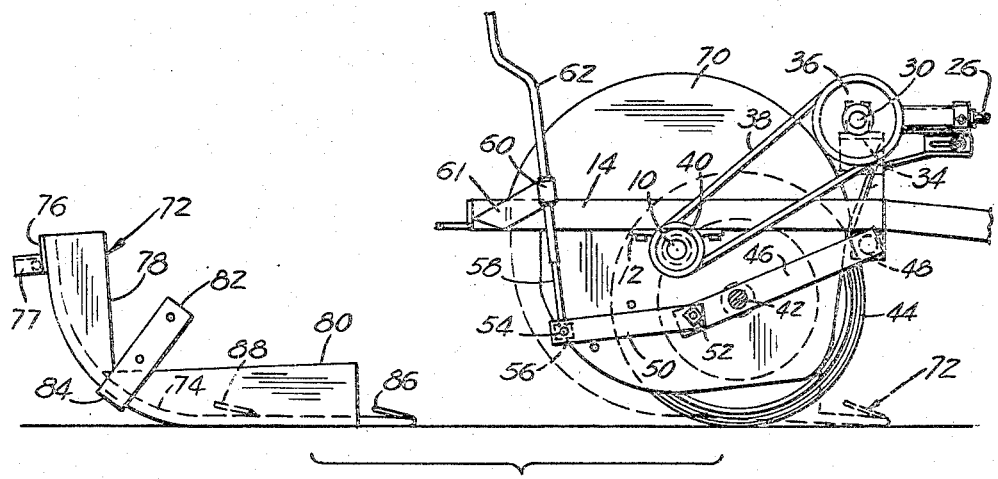
Figure 3 is a transverse sectional view on line 3—3 of Figure 1, the tine assembly being shown in full lines separated from the rest of the shredding machine, and in dotted lines attached to the machine.

The frame is rollably mounted, and to this end, there are provided short stub axles 42, on which are rotatably mounted ground wheels 44. The axles 42 as shown in Figure 3 are carried by hanger bars 46, at locations adjacent the rear ends of said hanger bars. The hanger bars are inclined, and at their front ends are fixedly connected to the end portions of a hanger support bar 48 rotatably mounted upon and extending transversely of the frame.

A depth control link 50 is pivotally connected at 52 to the rear end of each hanger 46, and at their rear ends, the links 50 are provided with pins 54 on which are mounted threaded blocks 56 engaging complementarily threaded adjusting screws 58 journalled intermediate their ends upon blocks 60 pivotally mounted upon inclined support plates 61 welded or otherwise fixedly attached to the sides of the frame adjacent the rear portion of the frame. The screws, above the blocks 60, have cranked ends 62 facilitating manual rotation of the screws. It will be understood that on rotation of the screws, adjustment of the frame, and hence of the shaft 10, for height can be effected, relatively to the ground surface.

Carried by the shaft 22 are articulated radial arms 64, having at their outer ends or tips V-shaped shredding blades 66 which, on rotation of the shaft at relatively high speed, will rotate rapidly through circular paths, to shred the material disposed in the path thereof.

Covering the shredding assembly defined by the shaft 10 and arms 64 is a part-cylindrical housing 68, having side walls 70, the wheel hangers 46 and the depth control links and screws being disposed exteriorly of the side walls of the housing.

In accordance with the present invention, there is provided a stalk pick-up or tine assembly generally designated 72. This is wholly separable from the parts of the structure previously described herein, as shown in Figure 3, to facilitate maintenance, repair, or cleaning of the machine and pick-up assembly.

The tine assembly includes a plurality of closely spaced, parallel, elongated tines 74 of rigid formation, said tines being closely spaced apart across the full width of the machine. The tines are all identically formed, so the description of one will suffice for all. As seen from Figure 2, each tine has a rear end portion curved through substantially 90 degrees of a circle, and a straight, forwardly projecting front end portion terminating in advance of the radial shredding arms, the front end portions of the tines being disposed in a common plane inclined from the horizontal. The inclination of the front ends of the tines from the horizontal is slight, and is such that the leading ends of the tines will be disposed in close proximity to the ground, while the inner ends of the straight tine parts are spaced a small distance above the ground.

Figure 2:
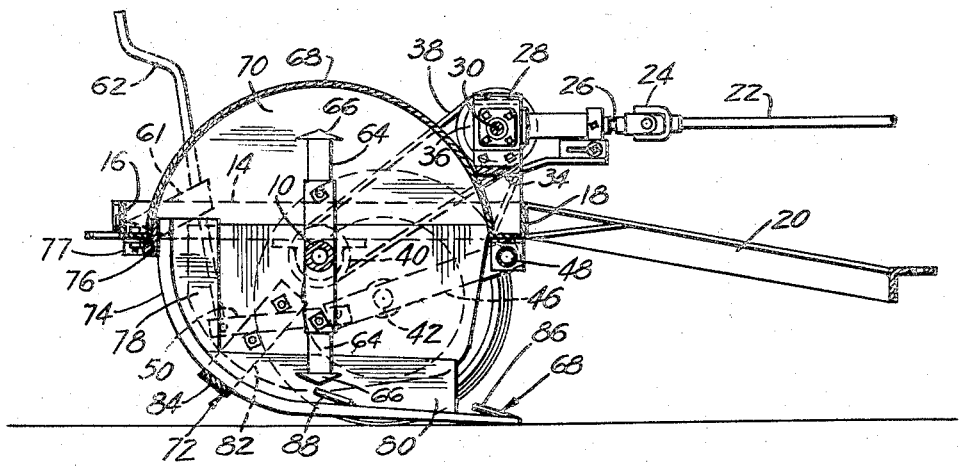
Figure 2 is a transverse sectional view on line 2—2 of Figure 1.

The curved, rear parts of the tines, at their upper extremities, are fixedly secured to a support bar 76, which is adapted to be bolted to the rear frame member 16. For the purpose of securing the tine assembly to the back member 16 of the frame, there is provided a bracket 77 welded or otherwise fixedly attached to the tine support bar 76 intermediate the opposite ends of the tine support bar. The bracket 77 is bolted to the underside of the frame member 16 when the structure is in use, as shown in Figure 2.

To reinforce the tine assembly, there are provided side plates 78, 80 at each side of said assembly, these being disposed exteriorly of the side walls 70 of the housing 68, and being secured fixedly to the outermost tines of the assembly.

Further reinforcing the assembly and providing additional means of securing the same to the shredding machine proper are inclined end portions 82 of a bottom bar 84 of the tine assembly. The bar 84 extends over the full width of said assembly, underlying the curved parts of the tines adjacent the merger of said curved parts into the straight extensions of the tines. The end portions 82 of said bar are bolted to the housing side walls.

Welded to the front ends of the tines are rearwardly extending, inclined lifting fingers 86, which act upon the stalks in the path of the machine to lift the same onto the extensions of the tines. Then, the stalks, moving along the tine extensions, encounter inner lifting fingers 88 which are formed similarly to the fingers 86, but are so disposed as to discharge the function of lifting the stalks once again directly into the path of the blades of the radial shredding arms.

The material is thus acted upon by the shredding blades, and to insure that said material will remain in the path of the shredding blades until it is fully and uniformly shredded, the curved parts of the tines are provided, these curving about an axis, common to the axis of rotation of the shaft 10, in close proximity to the blades of the radial arms. The curved parts of the tines hold the material in the path of the shredding blades as long as said material has not been reduced to a sufficiently fine, shredded state. When, finally, the material is shredded to a sufficient extent, it will pass through the small spaces between the tines, to the back of the machine, so as to be uniformly spread over the ground surface.

It will be seen from the above that an important characteristic of the invention resides in the particular adaptability of the pick-up assembly for elevating all stalks in the path of the machine, and guiding said stalks into the paths of the rapidly rotating radial shredding blades. This is of importance, because heretofore, many of the stalks have been so disposed upon the ground as to resist movement thereof into the path of the shredding blades. By reason of the present invention, not only are the stalks properly positioned for shredding, but are held in said position by the curved tine parts, until they are reduced to fragments of a sufficient size to permit passage through the spaces between the tines, making room for new material to be shredded.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A shredder comprising, in combination, a wheeled frame; a shaft journalled thereon; radial shredding arms on the shaft; means to rotate the shaft; and a tine assembly fixedly secured to the frame including a plurality of closely spaced tines curved for part at least of their lengths about the axis of rotation of the shaft and having their curved parts extending in close proximity to the tips of the arms to guide material to be shredded into the paths of the arms, the curved portions of said tines extending through substantially 90 degrees of a circle concentrically to and wholly outside the arc described by the tips of the arms and being spaced apart at the back of the frame to provide outlets for the shredded material, said tines including straight extensions projecting forwardly from the curved parts of the tines in a plane tangential to the arc described by the curved portions and inclined slightly from the horizontal below the shredding arms in close proximity to the ground surface, to guide the shredded material to the curved parts.

2. A shredder comprising, in combination, a wheeled frame; a shaft journalled thereon; radial shredding arms on the shaft; means to rotate the shaft; and a tine assembly fixedly secured to the frame including a plurality of closely spaced tines curved for part at least of their lengths about the axis of rotation of the shaft and having their curved parts extending in close proximity to the tips of the arms to guide material to be shredded into the paths of the arms, the curved portions of said tines extending through substantially 90 degrees of a circle concentrically to and wholly outside the arc described by the tips of the arms and being spaced apart at the back of the frame to provide outlets for the shredded material, said tines including straight extensions projecting forwardly from the curved parts of the tines in a plane tangential to the arc described by the curved portions and inclined slightly from the horizontal below the shredding arms in close proximity to the ground surface, to guide the shredded material to the curved parts, said straight extensions of the tines each having longitudinally spaced guide fingers inclined in a direction rearwardly upwardly from the leading ends of the extension and disposed wholly above said plane to lift the material to be shredded preliminary to movement of said material onto the curved tine parts.

3. A shredder comprising, in combination, a wheeled frame; a shaft journalled thereon; a plurality of radial shredding arms spaced longitudinally of the shaft and including shredding blades at the tips thereof; means to rotate the shaft; and a tine assembly fixedly secured to the same including a cross bar adapted for detachable, fixed connection to the same, a series of closely spaced, parallel, elongated tines fixedly secured at one end to the cross bar and depending from the cross bar, said tines at the ends thereof adjacent to the cross bar being curved through substantially 90 degrees of a circle concentrically to and wholly outside the arc described by the tips of the arms and at their other ends having straight extensions disposed in a substantially horizontal plane for movement along a ground surface, the curved parts of the tines curving about the axis of rotation of the shaft in close proximity to the arc described by the blades of the arms, to position the material to be shredded in the paths of said blades, said curved parts of the tines adjacent the cross bar being spaced apart at the back of the frame to provide outlets for the shredded material, and inclined fingers fixedly secured to the straight parts of the tines and spaced longitudinally of said straight parts, to lift the material to be shredded and dispose the same for guiding of the material to be shredded along the straight tine parts to the curved parts of the tines, the fingers of each extension being disposed one at the leading end of the extension and one inwardly from said leading end, said fingers inclining rearwardly upwardly from the extensions, the second named finger at its rear end terminating at said arc described by the tips of the blades.

References Cited in the file of this patent

UNITED STATES PATENTS

| | | |
|---|---|---|
| 311,842 | McElhaney | Feb. 3, 1885 |
| 976,329 | Witten | Nov. 22, 1910 |